Aug. 7, 1934.  J. W. LONG ET AL  1,969,467

NEWS AND ADVERTISING PROJECTION SYSTEM

Original Filed Oct. 23, 1931

INVENTOR-
J. W. LONG
R. STEENECK
BY
Eugene E. Brown
ATTORNEY-

Patented Aug. 7, 1934

1,969,467

UNITED STATES PATENT OFFICE 1,969,467

NEWS AND ADVERTISING PROJECTION SYSTEM

James W. Long, Plainfield, N. J., and Robert Steeneck, New York, N. Y., assignors to The Western Union Telegraph Company, New York, N. Y., a corporation of New York Original application October 23, 1931, Serial No. 570,728. Divided and this application October 23, 1931, Serial No. 570,729

12 Claims. (Cl. 88—24)

This invention relates to a telegraph system. It is particularly concerned with a telegraph system employing a receiving printer of the Burry page type, such as shown in U. S. Patent No. 962,694, granted June 28, 1910, but, of course, is not limited thereto.

The present application is a division of our copending application Serial No. 570,728, filed October 23, 1931, which matured into Patent No. 1,881,757 dated Oct. 11, 1932 and entitled Telegraph transmitting apparatus. It relates to that portion of the system described in the parent case, located at the receiving station. More specifically it relates to the joint control of a telegraph printer for a page projecting mechanism, such as shown and described in a copending application of Long and Wheeler, Serial No. 517,352, filed February 20, 1931, and entitled Page projector for recorders, for projecting news items upon a suitable screen, and a second projector alternating therewith for displaying previously prepared material, such as advertisements, news pictures and the like.

One of the objects of the present invention is to provide means at the receiving station responsive to signals transmitted over the telegraph circuit for selectively operating either of said projectors.

Another object is to provide means responsive to the transmitted signals for alternately shifting from one projector to the other.

A still further object is to provide mechanism for projecting previously prepared material on to a suitable screen during the printing of at least a portion of a news item and to then shift the projection to the printed record produced by the telegraph printer.

Numerous other objects and advantages will appear from the following description taken in connection with the accompanying drawing in which.

Figures 1, 2, 3:
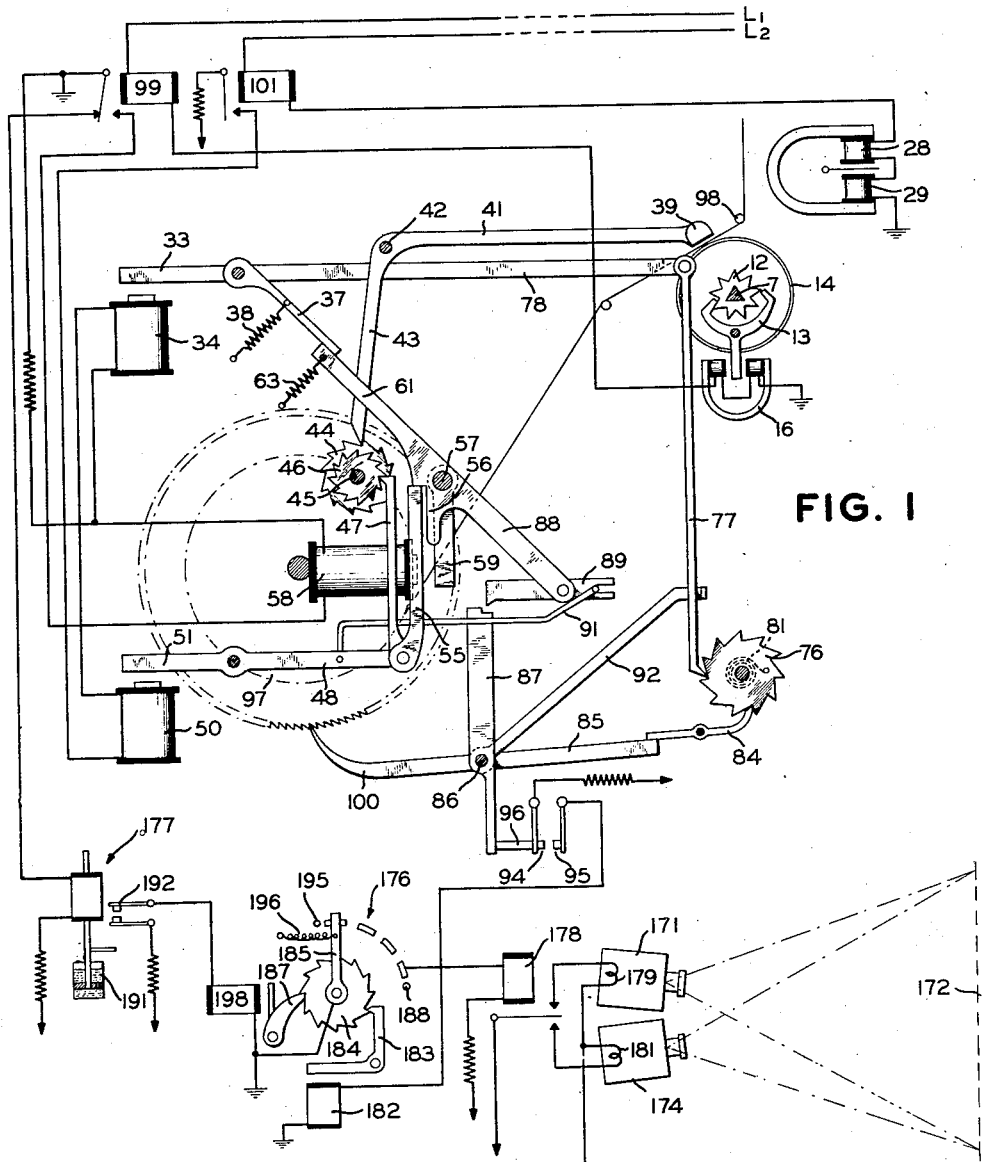
Figure 1 is a diagrammatic representation of the receiving apparatus for producing the printed record and for selectively controlling the operation of each of the projectors in response to telegraph signals.
Figure 2 is a diagrammatic showing of a projection system for the telegraph printer.
Figure 3 is a similar view of a projector for previously prepared lantern slides.

The invention is concerned with the operation of news projectors for use in public places, such as hotels, restaurants, show windows, etc., for displaying in enlarged characters upon a suitable screen, current news items transmitted telegraphically to the projecting apparatus. In accordance with the present embodiment of the invention the telegraph signals are recorded by a telegraph page printer from which each line, as it is printed, is advanced into the field of the projector. Preferably a predetermined time after the completion of each news item, the news projector is shut off and a second projector switched on for displaying locally prepared material on the screen during the course of printing of a definite number of lines of the succeeding news item. The locally prepared material may consist of lantern slides arranged in a suitable mechanism and automatically fed into projecting position or it may consist of a locally operated transmitter on which local items of information may be printed.

Referring first to Figure 1, the essential parts of the Burry page printer necessary for an understanding of the invention are shown. The parts of this figure have been numbered to correspond to the numerals used in the parent specification.

The printer briefly consists of a type wheel 14 mounted to slide freely on a triangle shaft 7 adapted to rotate with the shaft, whereby the type wheel can be revolved by rotating the shaft to bring any desired character to printing position and may be shifted latterly to effect letter spacing.

The type wheel shaft carries an escapement wheel 12 adapted to be controlled by an escapement lever 13, vibrated by a polarized magnet 16. As the armature 13 vibrates the escapement wheel is stepped around to bring the type wheel into printing position. The teeth of the escapement wheel are so arranged relative to the type wheel that the type wheel is stopped with a space between the two letters at the printing point. The type wheel may then be given a slight rotary movement either forward or backward to bring the desired type into printing position. This shift of the type wheel is effected by a magnet 34 and the direction of shift is controlled by a polarized shift magnet 28, 29, through mechanism not shown.

The printing is effected by a platen 39 mounted upon angular supports, one of which is shown at 41, pivoted at 42, and having a downwardly extending arm 43, engaging the teeth of a ratchet wheel 44, fixed on a shaft 45, whereby rotation of the ratchet wheel will rock the support 41 and throw the platen forward against the type wheel. A second ratchet wheel 46, carried by the shaft 45, is engaged by a vertical pawl 47, pivoted on a lever 48, adapted to be rocked by a magnet 50, through an armature portion 51.

In order to make the machine rapid in operation the magnets 28, 29, 34 and 50 are energized simultaneously but their armatures should not be actuated at the same instant. The shift magnet 28, 29 should precede the magnet 34, which in turn should precede the magnet 50. The precedence of magnet 28, 29 is secured by making it quicker in action and the proper order is given to the other magnets by the following means.

Pivoted on the arm 48 is an upstanding finger 55, normally engaging a rearward shoulder on a downwardly extending stop 56 mounted upon a shaft 57, rocked by a magnet 58, through an armature 59. As long as the finger 55 is in engagement with the stop, the arm 48 and pawl 47 cannot be raised. When the magnet 58 is energized, however, to rock the stop 56, so as to throw the finger 55 off of its shoulder, the pawl 47 may be raised to effect printing. The magnet 58 is energized simultaneously with the magnets 34 and 50, but should not actuate its armature until the magnet 34 has acted, since this latter magnet completes the shift of the type wheel under the control of the polarized magnets 28, 29. In order to insure the operation of magnet 58 after magnet 34, an arm 61, integral with the stop 56, is provided having engagement below an arm 37 rigid with the armature 33 of the magnet 34. In order for magnet 58 to operate before magnet 34, it is necessary to raise the arm 37 against its spring 38, but since the spring 38, added to the tension of the spring 63, connected to the arm 61, puts too great a load on the magnet 58 with the result that it cannot act to release the printing mechanism until magnet 34 has first acted to set the type wheel.

The letter spacing is produced by a ratchet wheel 76 and a pawl 77 extending upwardly therefrom and pivotally connected to an arm 78, also rigid with the armature 33. Each actuation of the magnet 34 raises the pawl 77, causing it to ride over a tooth of the ratchet wheel and upon de-energization of the magnet the pawl is depressed, rotating the ratchet wheel 76 to move the type wheel one letter space to the right of the printed page, through flexible cords, not shown. The return of the type wheel to its initial position is effected by a spring 81 coiled about the shaft of the ratchet wheel, having one end anchored thereto, whereby it is wound-up by the rotation of the ratchet wheel, as the type wheel moves to the right across the paper. The ratchet wheel is provided with a holding pawl 84, which serves to prevent unwinding of the spring during the retraction of the pawl 77. In order to return the type wheel to its initial position adjacent the left hand side of the paper, it is necessary to withdraw the pawls 77 and 84. This is effected through the following mechanism. Below the rear end of the pawl 84 is a finger 85, fixed to a shaft 86, also having thereon a vertically extending arm 87, provided with a shoulder on its upper end as shown. The shaft 86 is rocked by the arm 61 through the magnet 58 and for this purpose the arm 61 has an extension 88 provided with a small lever 89 arranged to engage the shoulder on the arm 87. Normally the lever is held out of engagement with the arm by a light spring rod 91 mounted upon the arm 48 and engaging the bifurcated forward end of the lever 89. When the arm 48 is raised by the magnet 50, the rear end of the lever 89 is depressed against the top of the arm 87. If the magnet 58 be now momentarily deenergized, it will permit the spring 63 to throw the arm 88 forward, that is to the right in Figure 1, and with it the lever 89, thus permitting the rear end of the latter to be depressed by the spring rod 91 into engagement with the shoulder of the arm 87. On again energizing magnet 58, the arm 88 moves the lever 89 rearwardly, rocking the arm 87 and disengaging the pawl 84 from the ratchet 76. The shaft 86 also has an upwardly inclined arm 92, the upper end of which extends in front of the pawl 77 and serves to withdraw the same from the ratchet wheel simultaneously with the withdrawal of the pawl 84. With both pawls disengaged the spring 81 is free to return the type wheel to its position at the beginning of the line.

Each movement of the lever 87, to effect the type wheel or carriage return, closes a pair of contacts 94 and 95 by means of a pin 96, for a purpose to be subsequently referred to.

The paper on which the impressions are made is drawn from a reel secured to a toothed disc 97 and passes between the platen and type wheel. From the platen the paper passes upward around a small roller 98 and into the field of a projector, as shown in Figure 2. Upon each type wheel return the disc 97 is released by an arm 100, also carried by the shaft 86, to permit the paper to be fed upwardly one line space in readiness for the succeeding line of printing.

The receiving mechanism is controlled by signals transmitted over two lines L1 and L2. In circuit with the line L1 is the escapement magnet 16 and in circuit with the line L2 are the shift magnets 28, 29. The magnet 58 is controlled by a relay 99 in line L1 and the magnets 34 and 50 are controlled by relay 101 in line L2.

The operation of the machine will now be readily understood. The first function to be performed is the rotating of the type wheel to bring the printing point between a pair of characters, one of which it is desired to print. For this purpose alternate positive and negative impulses are sent over the line L1 to actuate the escapement magnet 16 until the selected pair of characters are adjacent to printing position. Steady current is then applied to the line L1 to energize the magnet 58 but its armature is not actuated immediately since, as explained, the magnet cannot operate until its armature load is partially relieved by the action of the magnet 34. An impulse of either positive or negative polarity is sent over line L2 simultaneously with the application of steady current to line L1, the polarity of this last impulse determining which character of the pair is to be printed. The magnet 28, 29, being quick acting, the shift member is set before the magnets 34 and 50 are fully energized. With current flowing in both lines, the magnet 34, instantly after the operation of magnet 28, 29, draws down its armature to operate the shift member and position the type wheel in the correct printing position and at the same time raising the arm 37 off of the arm 61 and relieving the magnet 58 of part of its load. This magnet also being energized at the same time thereupon draws down its armature, releasing the printing mechanism by disengagement of the stop arm 55 and permitting the magnet 50 to actuate the platen. On de-energization of the magnets the parts are returned to normal position.

The printing wheel may be returned to its initial position from any point in its line of travel after the printing operation by interrupting the circuit to the magnet 58 and making it again, while maintaining the circuit to the magnets 34 and 50. The interruption of the circuit of magnet 58 lowers the lever 89 into contact with the arm 87 and as the circuit is again closed to the magnet 58, the arm 87 is thrown rearwardly, thus disengaging the pawls 77 and 84. The type wheel is thus returned to its leftward position.

It will be noted therefore that the signals required to operate the printer consist of current alterations followed by a steady impulse over one line and simultaneously with said steady impulse, an impulse of predetermined polarity over the other line. In order to effect the carriage return, the long impulse over line L1 is momentarily interrupted and remade while the circuit is maintained over line L2.

The sheet upon which printing is effected is fed upwardly into the field of a projector. This is illustrated diagrammatically in Figure 2 in which the paper is shown being fed between the type wheel 14 and platen 39 and thence over the roller 98 and up into the field of the projector 171 by which the image of the printed sheet is thrown upon the rear of a screen 172. The paper is taken up on an upper reel 173. As clearly disclosed in the aforementioned application of Long and Wheeler, the arrangement of the platen relative to the printer is such that each line, as it is completed, is advanced directly into the field of the projector.

In Figure 1 we have shown a second projector 174 associated with the news projector 171, both projectors being disposed with the center line of projection slightly off normal to the screen 172, whereby either projector may be employed to illuminate the same area of the screen. The projector 174 may be a locally controlled printer projector, a moving picture projector, or an automatic lantern slide projector. The latter form has been diagrammatically illustrated in Figure 3 as provided with an endless slide carrier 175 arranged to feed the slides one at a time into the field of the projector. A projector of this type is shown in patent to Patterson, No. 1,352,471, granted September 14, 1920. The slides may embody advertising matter, news pictures, written or printed notices, or any other desired material.

Line signals transmitted to the printer serve to control the alternate operation of the projectors 171 and 174. The Burry printer operates at a speed somewhat slower than that at which the items may be readily read. It is desirable, therefore, during the printing of the first part of the item, for instance the first four lines, to switch the projection to the advertising projector 174 and after completion of the printing of these lines to return the control to the news projector 171. The news projector is then maintained in operation until the printing of the item has been completed. After the last line of the news item appears on the screen, sufficient time is given to enable the reading of the message to be completed, after which the news projector is again switched off and the advertising projector switched on and maintained in operation until the first part of the succeeding message has been printed.

The mechanism for effecting the alternate operation of the projectors comprises a stepping relay 176 and a time switch mechanism 177. In the position shown in Figure 1, the light controlling relay 178 is de-energized, interrupting the circuit to the lamp 179 of the projector 171 and completing the circuit for the lamp 181 of the projector 174, so as to project the advertising matter onto the screen 172. If a news item is now printed, the news projector 171 will remain off until the first four lines of the item have been completed. It will be recalled that upon each carriage return, the switch contacts 94, 95 of the printer were closed. These contacts are included in a circuit with the stepping magnet 182 of the switch 176, so that upon the completion of each line, the magnet 182, is energized to attract its pawl 183 so as to step the ratchet wheel 184 one tooth. The ratchet wheel is held during retraction of the pawl 183 by a holding pawl 187. As the fourth line of printing moves upward into the field of the projector, the arm 185 will be moved onto the last contact 186 against the stop member 188. A circuit will be completed at this time from ground at the arm 185 to the maget 178, causing it to attract its armature and switching the light circuit from the lamp 181 to the lamp 179. The four lines of printed matter are then thrown onto the screen and as each succeeding line is completed, it is advanced into the field of the projector. The projector remains in operation until a special signal is received over the line. In the present embodiment this signal for switching from the news projector to the advertising projector at the end of a news item, consists of a prolonged series of current alternations transmitted over the line L1. This series of current alternations continues over an interval of several seconds, preferably about fifteen. The purpose of prolonging the switching impulses is to maintain the last printed line on the screen sufficiently long to enable complete reading thereof before the switch-over occurs.

The line relay, 99, as stated, is of a sluggish nature so as not to respond to current alternations of the frequency transmitted, and consequently, during the transmission of current alternations it rests upon its back contact applying ground to the winding 189 of the time switch 177. This switch is adjusted, by means of a dashpot 191, so that it does not act within the time consumed in the transmission of current alternations incident to the normal printing operation, which require only a frequency of a second, but upon application of current alternations to the line for a prolonged period, it acts to close the contact 192, completing a circuit to the release magnet 198, thereby withdrawing the holding pawl 187 and permitting the ratchet wheel 184 and arm 185 to be returned to its initial position against the stop 195, by the spring 196. The circuit to the magnet 178 is thus interrupted, switching the lighting circuit to the advertising projector 174.

It is obvious, of course, that various modifications of the printing and control mechanism will occur to those skilled in the art without departing from the invention and, therefore, we do not desire to be limited to the exact details shown and described, except in accordance with the requirements of the appended claims.

What we claim is:

1. In a telegraph system, a line, a receiving printer of the page type responsive to signals transmitted over said line, a projector associated with the printer, and means actuated automatically after a predetermined number of lines have been printed for starting the operation of said projector.

2. In a telegraph system, a line, a receiving printer of the page type having line feed mechanism, said printer being responsive to signals transmitted over said line to operate said line feed mechanism, a projector associated with the printer, and means operated by a predetermined number of actuations of the line feed mechanism for starting the operation of said projector.

3. In a telegraph system, a line, a receiving printer, a projector associated with the printer, means controlled by printer operating signals, transmitted over said line, for initiating the operation of said projector, means also responsive to signals transmitted over said line to stop the operation of said projector, said last means being slow acting, whereby to permit a substantial period to elapse between the last printing signal and the stopping of the operation of the projector.

4. In a telegraph system, a line, a receiving printer of the page type having line feed mechanism, said printer being responsive to signals transmitted over said line to operate said line feed mechanism, a projector associated with the printer, a contact operated with each actuation of the line feed mechanism, and a stepping switch controlled by said contact for starting the operation of the projector after a predetermined number of actuations of the line feed mechanism.

5. In a telegraph system, a line, a receiving printer of the page type, responsive to signals transmitted over said line, a projector associated with the printer, a second projector, said projectors being operatively associated with a common screen, and means acting automatically after a predetermined number of lines have been printed for stopping the operation of one projector and starting the operation of the other.

6. In a telegraph system, a line, a receiving printer of the page type, responsive to signals transmitted over said line, a first projector associated with the printer, a second projector, said projectors being operatively associated with a common screen, means acting after a predetermined number of lines have been printed for stopping the operation of the second projector and starting the operation of the first projector, and means also responsive to signals transmitted over said line, for stopping the operation of the first projector and again starting the operation of the second projector.

7. In a telegraph system, a line, a receiving printer of the page type, responsive to signals transmitted over said line, a first projector associated with the printer, a second projector, said projectors being operatively associated with a common screen, means acting after a predetermined number of lines have been printed for stopping the operation of the second projector and starting the operation of the first projector, and means responsive to signals transmitted over said line for stopping the operation of the first projector and again starting the operation of the second projector, said last means being slow acting, whereby to permit a substantial period to elapse between the printing of the last character and the stopping of the operation of the first projector.

8. In a telegraph system, a line, a receiving printer, a relay associated with said line, said relay being non-responsive to printer operating signals but responsive to a prolonged signal condition of predetermined character, and a projector associated with the printer controlled by said relay.

9. In a telegraph system, a page printer for producing a printed record, said printer having a line feed mechanism, a stepping switch actuated upon each operation of the line feed mechanism, and display means for said printed record operated by said stepping switch after a predetermined number of line feed operations have occurred.

10. In a telegraph system, a receiving printer, contact means arranged to be operated by predetermined printer operations in response to printer actuating signals transmitted to the printer, a projector, an electric circuit for controlling the operation of said projector means responsive to a predetermined plural number of operations of said contact means for modifying the condition of said electric circuit to start said projector into operation, and means responsive to non-printer actuating signals for further modifying the condition of said circuit to stop the operation of said projector.

11. In a telegraph projecting apparatus, a screen, a telegraph line, a projector, a telegraph printer associated therewith and responsive to signals transmitted over the line to produce a printed record upon said screen, a second projector associated with said screen, and means controlled by signals transmitted over said line for causing the operation of said second projector during at least a portion of the period of operation of said printer, and means acting automatically for stopping the operation of said second projector and starting the operation of the first projector concomitantly with the completion of said portion of the period of operation of said printer.

12. In a telegraph projecting apparatus, a screen, a telegraph line, a telegraph printer associated therewith and responsive to signals transmitted over the line to print items of information, a projector for projecting the printed item upon said screen, a second projector associated with the screen, means controlled by signals transmitted over said line for causing the operation of the second projector during the printing of at least a portion of each item, and means acting automatically for stopping the operation of said second projector and starting the operation of the first projector concomitantly with the completion of said portion of each item.

ROBERT STEENECK.
JAMES W. LONG.